United States Patent

[11] 3,622,620

[72] Inventors Shigeki Horiie
Tokyo;
Chiyuki Fujii, Kanagawa-ken; Atsuhiro Ihara, Tokyo; Hideo Nedachi, Tokyo; Takeo Shinada, Kanagawa-ken, all of Japan
[21] Appl. No. 869,932
[22] Filed Oct. 27, 1969
[45] Patented Nov. 23, 1971
[73] Assignee Denki Kagaku Kogyo Kabushiki Kaisha
Tokyo, Japan
Continuation-in-part of application Ser. No. 645,894, June 14, 1967, now abandoned. This application Oct. 27, 1969, Ser. No. 869,932

[54] METHOD OF MAKING VINYL ACETATE
8 Claims, No Drawings
[52] U.S. Cl. ........................................................ 260/497 A, 252/431 R, 252/431 C
[51] Int. Cl. ........................................................ C07c 69/24
[50] Field of Search ........................................... 260/497 A

[56] References Cited
UNITED STATES PATENTS
3,346,626  10/1967  Schaeffer et al. ............  260/497

*Primary Examiner*—James A. Patten
*Assistant Examiner*—Richard D. Kelly
*Attorney*—Kemon, Palmer & Estabrook ABSTRACT: Manufacture of vinyl acetate by reacting ethylene with acetic acid and oxygen in the presence of a platinum group catalyst is improved by increasing catalytic reaction with a promotor, namely, a vanadyl salt of chloroacetic, fluoroacetic or sulfonic acids.

METHOD OF MAKING VINYL ACETATE

CROSS-REFERENCE TO RELATED APPLICATION

This application is a continuation-in-part of our copending Ser. No. 645,894, filed June 14, 1967, and now abandoned, and assigned to the same assignee as the present invention.

BACKGROUND OF THE INVENTION

This invention relates to a method of making vinyl acetate, and more particularly to a method of making vinyl acetate by reacting ethylene gas with acetic acid and oxygen gas in the presence of a platinum group catalyst using a promotor for said reaction.

Such methods are already known in the prior art. For instance, I.I. Moiseef obtained vinyl acetate according to the developed method using palladium chloride as a catalyst and sodium acetate as the promotor. (Proc. Acad. Sci. U.S.S.R., 133, 377, 1960.) However, this method is not economically advantageous, because one mole or more of expensive palladium chloride are required for producing one mole of vinyl acetate.

In Belgian Pat. 635,739, p-benzoquinone was added as the promotor, and in British Pat. 964,001, a catalyst of redox type containing cupric chloride or cupric acetate as the promotor was used. These methods, however, are not satisfactory to their practice for several reasons such as insufficient activity of the promotor, occurrence of byproducts or rapid lowering of the catalyst activity.

Further, in Belgian Patent 615,596, some vanadium compounds such as vanadium halide, sulfate, thiosulfate, sulfite or carboxylate were used as the promotor. In U.S. Pat. No. 3,346,626, vanadyl halide was used as the promotor together with a cupric or ferric salt. However, the promotors of vanadium compound in these patents do not sufficiently make for the reaction, but primarily prevent the occurrence of byproduct such as oxalic acid.

SUMMARY OF THE INVENTION

An object of the present invention is to perform the above-mentioned catalytic reaction more efficiently than before.

The above object may be attained in accordance with the present invention by employing novel promotors that have not ever been known in the art of vinyl acetate production by means of reacting ethylene with acetic acid and oxygen in the presence of a platinum group catalyst. The discovered promotor is an organic vanadyl salt of an acid selected from the group consisting of monochloroacetic, dichloroacetic, trichloroacetic, monofluoroacetic, difluoroacetic, trifluoroacetic, alkyl sulfonic, aromatic sulfonic and cycloalkylsulfonic acid.

DETAILED DESCRIPTION OF THE INVENTION

In the prior art, it has been known that some vanadium compounds, such as vanadium halide, sulfate, carboxylate, oxide or alkali vanadate could be used as a promotor for the catalytic reaction of making vinyl acetate using ethylene, acetic acid and oxygen in the presence of a platinum group catalyst. However, these promotors have insufficient activity as mentioned before.

In U.S. Pat. No. 3,346,626, vanadyl halide such as vanadyl bromide, monochloride, dichloride or trichloride, was used as the promotor. The vanadyl group represented by $VO^{+1}$, $VO^{+2}$ or $VO^{+3}$ is a positive radical of which vanadium atom has a valence of from three to five, combined with an atomic oxygen. It may be supposed that the atomic oxygen combined with the vanadium atom in the vanadyl salt of halogenic acid would promote the catalytic reaction more effectively than other kinds of promotor. Nevertheless, as a matter of fact, it has been discovered that the addition of vanadyl halides, in like manner as vanadium compounds of other type, does not appreciably increase the attractive high rate of oxidation in the catalytic process. As mentioned before, these vanadium compounds including vanadyl halides may act primarily to prevent the occurrence of byproduct such as oxalic acid in the reaction medium.

It has been discovered by the present inventors that special organic vanadyl salts are remarkably effective to promote the catalytic reaction to make vinyl acetate using ethylene, oxygen and acetic acid in the presence of a platinum group catalyst. Said discovered promotors include organic vanadyl salts of chloroacetic, fluoroacetic, alkylsulfonic, aromatic sulfonic and cycloalkylsulfonic acids. There are contained in said promotors mono-, di- and tri-chloroacetates and fluoroacetates respectively, and from $C_1$ to $C_6$ alkylsulfonates. As the aromatic sulfonate there are contained benzenesulfonate, or from $C_1$ to $C_4$ alkyl substituted benzenesulfonate, e.g., toluene-, xylene-, ethylbenzene-, cumen-, and butylbenzene-sulfonates.

Vanadyl sulfate can not be used for the promotor because of its very low solubility in the reaction medium, whereas vanadyl sulfonates are all soluble therein and very useful as the promotor.

These organic vanadyl salts of the present invention can be used separately or as a combinated set of more than two salts. The suitable range of using amounts is from 0.1 to 100 moles per one mole of platinum group catalyst, and preferably from 0.5 to 30 moles per the same. In other words, the range of suitable concentration is from 0.01 to 1.0 percent by weight of the reaction medium. If the amount of these vanadyl salts in the reaction medium is less than the above, the promotion of the reaction would not be performed sufficiently. If that is more than the above, the effect of the promotor would increase no more, and it would become uneconomical. Moreover, there is a fear of increase in side reaction in the latter case.

By using the organic vanadyl salts of the present invention as a promotor, the promotion of catalytic reaction in making vinyl acetate is effectively performed without raise of reaction temperature and with less amount of byproducts, and moreover the life of the platinum group catalyst can be remarkably elongated.

The catalyst employed in this reaction is the so-called platinum group catalyst which contains metal, oxide, or salts of palladium as well known in the art. These catalysts are used by dissolving or suspending in the reaction medium, or by depositing on the carrier of active charcoal, granular alumina or silica gel in the ordinary manner. There is no limitation about the using proportion of the catalyst to the reaction medium, but it is preferable to keep it in the range from 0.001 to 1 percent by weight of the medium. In the case of depositing on the carrier, the amount of the catalyst is preferable to be from 0.1 to 10 percent by weight of the carrier.

Acetic acid used as a raw material of the present method is in the form of anhydrous acid on an ordinary occasion, but can be allowed to contain some amount of water permitting a small amounts of byproducts, and also can be used in the diluted state of solution by other inactive solvent such as dimethylformamide, dimethyl-acetamide, benzonitrile, dimethylsulfoxide and dioxane.

The oxygen gas used in this reaction includes substantially pure molecular oxygen, air and a mixture of oxygen gas with nitrogen or other inert gas.

The reaction may be performed at an atmospheric pressure, but the reaction velocity becomes beneficially large at high pressure in the range of 2.0 to 70 Kg./cm.² The suitable reaction temperature is in the range of 80 to 130° C. to prevent the growth of byproduct or the decomposition of the product.

In the prior arts of making vinyl acetate by reacting ethylene with acetic acid and oxygen in the presence of a platinum group catalyst, there has generally been added another promotor of alkaline or alkaline earth metal salt other than normal promotors. In the method of present invention, however, the existence of such salts is needless substantially, and the reaction can be smoothly performed without such salts. Of course there is no obstacle if such alkaline metal salts were additively used by means of retarding side reaction in the method of the present invention.

EXAMPLES

The more detailed practice of the present invention is illustrated by the following examples. In these examples, what is called yield, that is, represented by mole percent of vinyl acetate or acetaldehyde to the catalyst, means that, when 1 mole of vinyl acetate or acetaldehyde is produced using 1 mole of catalyst during 1 hour, the yield is represented by 100 mole percent per hour.

EXAMPLE 1

Into a glass-lined autoclave having a volume of 100 ml., 17 mg. of palladium chloride as a catalyst, 0.43 g. of vanadyl p-toluenesulfonate as a promoter, 60 g. of anhydrous acetic acid as a raw material, and 1.2 g. of anhydrous lithium acetate as a retarder for side reaction were poured together. Then the content was heated and maintained at a temperature of 120° C., while introducing ethylene gas and oxygen gas into the autoclave under the partial pressure of ethylene to be 30 kg./cm.$^2$ and the partial pressure of oxygen to be 6 kg./cm.$^2$.

After agitating the content for 1 hour, the reaction product was analyzed by means of gas chromatography. The product contained 1.48 g. of vinyl acetate and 0.06 g. of acetaldehyde, and the yield of vinyl acetate was 17,200 mole percent per hour.

EXAMPLE 2

The same process as the example 1 was carried out except using 1.0 g. of vanadyl butanedisulfonate instead of vanadyl p-toluenesulfonate as a promoter. The yield of vinyl acetate was 24100 mole percent per hour.

EXAMPLE 3

The same process as the example 1 was carried out except using 0.3 g. of vanadyl monofluoroacetate instead of vanadyl p-toluenesulfonate as a promoter. The yield of vinyl acetate was 6990 mole percent of per hour.

EXAMPLE 4

The same process as the example 1 was carried out except using 0.4 g. of vanadyl benzenesulfonate instead of vanadyl p-toluenesulfonate as a promoter. The yield of vinyl acetate was 18050 mole percent per hour.

EXAMPLE 5

The same process as the example 1 was carried out except using 0.18 g. of vanadyl trifluoroacetate instead of vanadyl p-toluenesulfonate as a promoter. The yield of vinyl acetate was 4970 mole percent per hour.

When 0.8 g. of vanadyl trifluoroacetate was used, the yield became to 16500 mole percent per hour.

When 1.2 g. of vanadyl trifluoroacetate was used, the yield became to 19800 mole percent per hour.

Reference examples

The same processes as the example 1 were carried out except using each 0.2 g. of the following promotors which are not included in the group of the present invention. The yields of vinyl acetate in each case are noted respectively.

| Promotor | Yield (mole % per hour) |
| --- | --- |
| Vanadium pentoxide | 1280 |
| Vanadium tetrachloride | 1550 |
| Vanadyl trichloride | 1290 |
| Vanadyl dichloride | 1320 |
| Vanadyl maleate | 1650 |
| Sodium metavanadate | 1020 |

EXAMPLE 6

Into a glass lined autoclave having a volume of 100 ml., 0.2 g. of granular active charcoal of 1 to 2 mm. size carrying 1 mg. of metallic palladium as a catalyst, 6 g. of sodium acetate as a retarder for side reaction, 0.3 g. of vanadyl difluoroacetate as a promotor and 60 g. of anhydrous acetic acid as a raw material were poured together. Then the content was heated and maintained at a temperature of 100° C., while introducing ethylene gas and oxygen gas into the autoclave under the partial pressure of ethylene to be 40 kg./cm.$^2$ and the partial pressure of oxygen to be 10 kg./cm.$^2$.

After agitating the content for one hour, the reaction product was taken out and analyzed. The yield of vinyl acetate was 9800 mole percent per hour.

EXAMPLE 7

Using 20 g. of granular silica gel of 3.2 mm. size carrying 0.1 g. of metallic palladium as a catalyst, 0.2 g. of vanadyl monochloroacetate as a promotor, 8.2 g. anhydrous lithium acetate as a retarder for side reaction and 60 g. of anhydrous acetic acid as a raw material, the similar reaction as the example 6 was carried out for five hours.

When 0.5 g. of vanadyl monochloroacetate was used, the yield became to 12050 mole percent per hour.

EXAMPLE 8

The same process as the example 7 was carried out using 0.35 g. of vanadyl dichloroacetate instead of vanadyl monochloroacetate as a promotor. The yield of vinyl acetate was 6500 mole percent per hour.

EXAMPLE 9

The same process as the example 7 was carried out using 0.35 g. of vanadyl trichloroacetate instead of vanadyl monochloroacetate as a promotor. The yield of vinyl acetate was 6910 mole percent per hour.

Reference examples

The same processes as the example 7 were carried out except using the following promotors which are not included in the group of the present invention. The respective amount of the promotors used and the respective yield are shown as follows.

| Promotor | Amount (g.) | Yield (mole % per hour) |
| --- | --- | --- |
| Vanadium tetraoxide | 0.2 | 750 |
| Vandium trichloride | 0.5 | 1530 |
| Vanadium tetrachloride | 0.23 | 930 |
| Vanadyl monochloride | 0.2 | 1530 |
| Vanadyl dichloride | 0.16 | 1350 |
| Vanadyl trichloride | 0.2 | 3530 |
| Vanadyl trichloride | 1.0 | 4360 |
| Vanadyl dibromide | 0.1 | 1210 |

EXAMPLE 10

Using 0.022 g. of palladium acetate as a catalyst, 0.2 g. of vanadyl methanesulfonate as a promotor, and 60 g. of anhydrous acetic acid as a raw material, the similar reaction was carried out at a temperature of 90° C. under the partial pressure of ethylene to be 55 kg./cm.$^2$ and the partial pressure of oxygen to be 8 kg./cm.$^2$ for 3 hours. The yields of vinyl acetate and acetaldehyde were 8720 and 2060 mole percent per hour respectively.

When 6 g. of sodium acetate was added to the above content as a retarder for side reaction, the yields of vinyl acetate and acetaldehyde became to 8910 and 480 mole percent per hour respectively.

EXAMPLE 11

Almost same results were obtained when vanadyl ethane-, propane-, pentane- or hexane-sulfonate was used instead of vanadyl methanesulfonate as the promotor in the example 10.

EXAMPLE 12

The same process as the example 1 was carried out except using 1.0 g. of granular alumina of 3 mm. size carrying 0.01 g. of palladium oxide as a catalyst, 8.5 g. of sodium acetate as a retarder for side reaction and 0.4 g. of vanadyl cyclohexylsulfonate as a promotor, instead of palladium chloride itself, anhydrous lithium acetate and vanadyl p-toluenesulfonate respectively. The yields of vinyl acetate and acetaldehyde were 14100 and 1650 mole percent per hour respectively.

EXAMPLE 13

The same process as the example 12 was carried out except using 1.0 g. of granular active charcoal of 1 to 2 mm. size carrying 5 mg. of palladium chloride as a catalyst and 0.5 g. of vanadyl cyclopentylsulfonate as a promotor, instead of palladium chloride carried by granular alumina and vanadyl cyclohexylsulfonate. The yields of vinyl acetate and acetaldehyde were 20200 and 2390 mole percent per hour respectively.

What is claimed is:

1. In the method of making vinyl acetate by reacting ethylene with acetic acid and molecular oxygen in the presence of a catalyst for the reaction selected from the group consisting of metal-, oxide- and a salt of palladium in a liquid phase, the improvement which comprises promoting the reaction by including in the reaction medium an organic vanadyl salt of an acid selected from the group consisting of chloroacetic, fluoroacetic, alkyl sulfonic, aromatic sulfonic and cycloalkyl sulfonic acid.

2. A method as claimed in claim 1 wherein said chloroacetic acid is selected from the group consisting of monochloro-, dichloro- and trichloroacetic acid.

3. A method as claimed in claim 1 wherein said fluoroacetic acid is selected from the group consisting of monofluoro-, difluoro- and trifluoroacetic acid.

4. A method as claimed in claim 1 wherein said alkyl sulfonic acid is selected from the group consisting of methane-, ethane-, propane-, butane-, pentane- and hexanesulfonic acid.

5. A method as claimed in claim 1 wherein said aromatic sulfonic acid is benzenesulfonic acid.

6. A method as claimed in claim 1 wherein said aromatic sulfonic acid is p-toluenesulfonic acid.

37. A method as claimed in claim 1 wherein said cycloalkylsulfonic acid is cylcopentylsulfonic acid.

8. A method as claimed in claim 1 wherein said cycloalkylsulfonic acid is cyclohexylsulfonic acid.

* * * * *